United States Patent [19]

Matsuda et al.

[11] Patent Number: 4,691,283
[45] Date of Patent: Sep. 1, 1987

[54] AUTOMATIC REGISTRATION IN AN ELECTRONIC CASH REGISTER

[75] Inventors: Kumehiko Matsuda, Jyoyo; Kensaku Komai, Yamatokoriyama, both of Japan

[73] Assignee: Sharp Kabushiki Kaisha, Osaka, Japan

[21] Appl. No.: 869,835

[22] Filed: May 28, 1986

Related U.S. Application Data

[63] Continuation of Ser. No. 563,526, Dec. 20, 1983, abandoned.

[30] Foreign Application Priority Data

Dec. 27, 1982 [JP] Japan .............................. 57-231086

[51] Int. Cl.⁴ ............................................. G06F 15/20
[52] U.S. Cl. .................................. 364/405; 364/900
[58] Field of Search ............................ 364/400–401, 364/404–405, 200 MS File, 900 MS File; 235/2, 7 R

[56] References Cited

U.S. PATENT DOCUMENTS

| 3,267,436 | 8/1966 | Alpert et al. ............... 364/405 X |
| 3,806,711 | 4/1974 | Cousins, Jr. ................ 364/405 X |
| 3,946,220 | 3/1976 | Brobeck et al. ............. 364/405 X |
| 4,144,567 | 3/1979 | Tadakuma et al. ........... 364/405 |
| 4,360,872 | 11/1982 | Suzuki et al. ............... 364/405 |
| 4,419,738 | 12/1983 | Takahashi et al. .......... 364/900 |
| 4,441,160 | 4/1984 | Azcua et al. ................ 364/900 |
| 4,484,277 | 11/1984 | Uesugi ........................ 364/405 |
| 4,493,037 | 1/1985 | Takano et al. .............. 364/405 |
| 4,503,503 | 3/1985 | Suzuki ........................ 364/405 |
| 4,508,962 | 4/1985 | Yamasaki .................... 364/405 X |

Primary Examiner—Gary V. Harkcom
Attorney, Agent, or Firm—Birch, Stewart, Kolasch & Birch

[57] ABSTRACT

An electronic cash register includes an automatic registration instruction key for instructing an automatic registration operation wherein registration operation related to plural commodities is automatically conducted by the single actuation of the automatic registration instruction key. A preset system is provided for presetting desired operation sequence into a memory system. The automatic registration operation is conducted in accordance with the operation sequences stored in the memory system.

2 Claims, 5 Drawing Figures

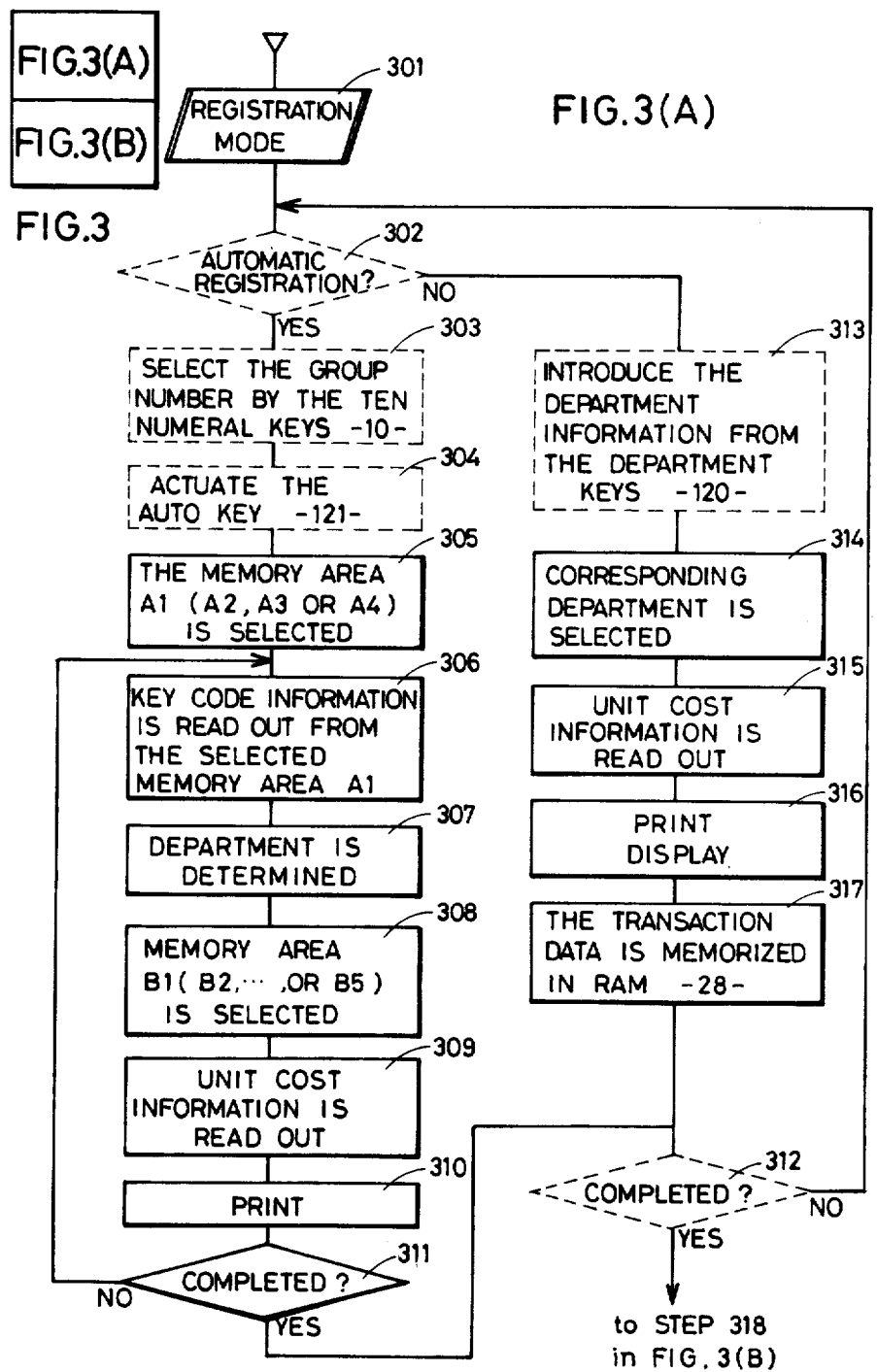

AUTOMATIC REGISTRATION IN AN ELECTRONIC CASH REGISTER

This application is a continuation of application Ser. No. 563,526 filed on Dec. 20, 1983, now abandoned.

BACKGROUND AND SUMMARY OF THE INVENTION

The present invention relates to an electronic cash register and, more particularly, to a registration control system in an electronic cash register.

Generally, a plurality of function keys must be actuated to conduct the registration operation related to one customer. On the other hand, a set of keys are frequently used in a predetermined order to conduct the registration operation in a specific store. If the registration operation of the above-mentioned set of keys are automatically carried out in the predetermined order upon actuation of a lesser number of keys, for example, only one key, the registration operation will become easy.

Accordingly, an object of the present invention is to provide a novel registration control system in an electronic cash register.

Another object of the present invention is to provide an electronic cash register wherein the registration operation of a plurality of function keys are automatically conducted in a predetermined order when a single function key is actuated.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, an operation sequence memory system is provided. A desired operation sequence related to a set of function keys is preset in the operation sequence memory system. When an automatic registration instruction key is actuated, the operation sequence stored in the operation sequence memory system is automatically executed so that the registration operation related to a plurality of articles is automatically conducted in accordance with the operation sequence stored in the operation sequence memory system.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIGS. 3(A) and 3(B) are flow charts for explaining a registration operation conducted by the electronic cash register of FIG. 1; and FIG. 3 is a diagrammatic illustration of how FIGS. 3(A) and 3(B) are combined.

DESCRIPTION OF THE PREFERRED EMBODIMENTS

Figure 1:
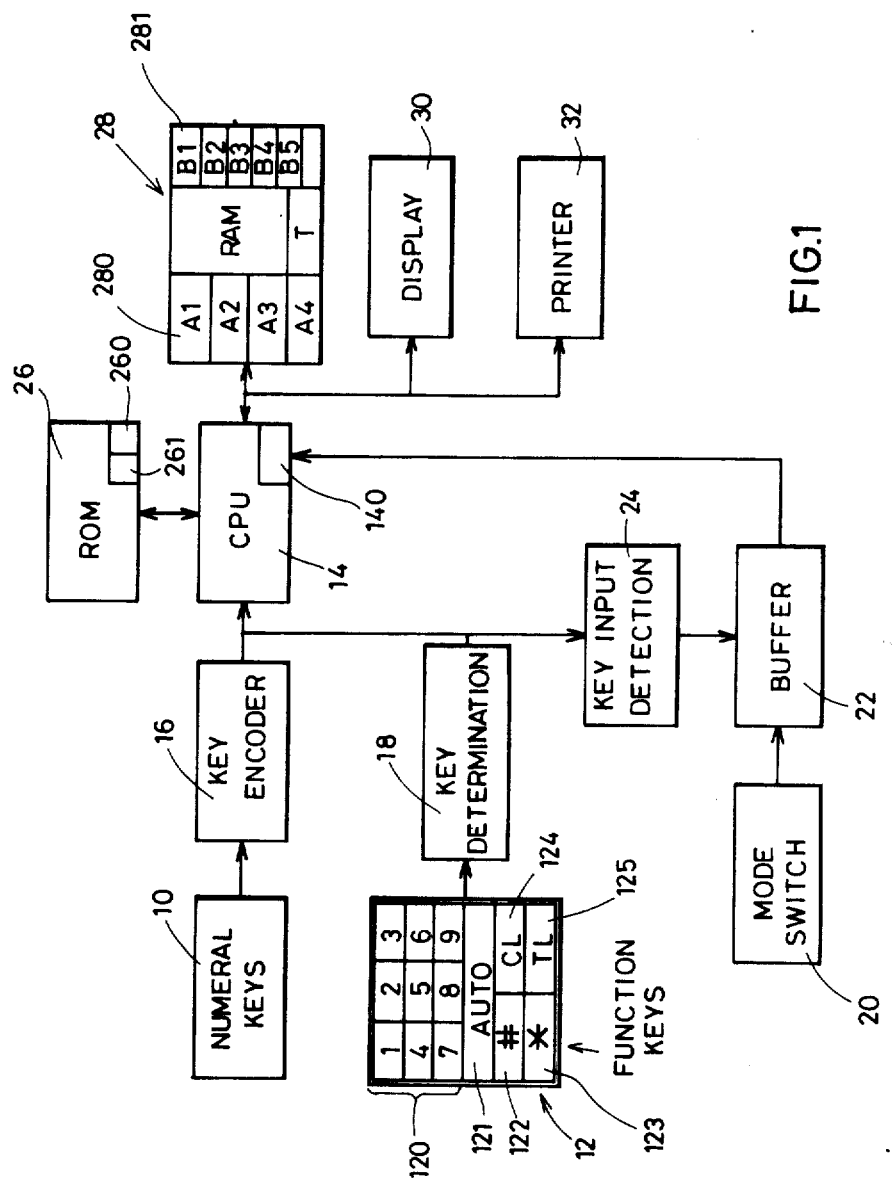
FIG. 1 is a block diagram of an embodiment of an electronic cash register of the present invention.

The electronic cash register of the present invention includes ten numeral keys 10 for introducing numeral data, and a function keyboard 12 for introducing function commands. The numeral data introduced from the ten numeral keys 10 is transferred to a central processing unit (CPU) 14 via a key encoder 16. The function keyboard 12 includes department keys 120 for identifying the department to which the article belongs, an automatic registration instruction key (AUTO) 121, a program selection instruction key (#) 122, a RAM area selection key (*) 123, a preset operation completion instruction key (CL) 124, and a registration operation completion instruction key (TL) 125. A key determination circuit 18 is connected to the function keyboard 12 to detect the actuation of the function keys included in the function keyboard 12.

A mode selection switch 20 is provided for selecting the preset mode and the registration mode. The mode information selected by the mode selection switch 20 is temporarily stored in a buffer 22. When any one of the ten numeral keys 10 or the function keys included in the function keyboard 12 is actuated, a key input detection circuit 24 develops a control signal to transfer the mode information temporarily stored in the buffer 22 to a mode memory section 140 included in the central processing unit (CPU) 14. A read only memory (ROM) 26 is connected to the central processing unit (CPU) 14, which memorizes programs for controlling various operations conducted by the central processing unit (CPU) 14.

A random access memory (RAM) 21 is connected to the central processing unit (CPU) 14 in order to store the data processed by the central processing unit (CPU) 14. The random access memory (RAM) 28 includes memory areas A1, A2, A3 and A4 for storing preset operation sequences for controlling the automatic registration of plural commodities. The central processing unit (CPU) 14 is further connected to a display device 30 for visually displaying the operation results, and a printer 32 for printing out the operation results onto a receipt slip and/or journal paper.

Figure 2:
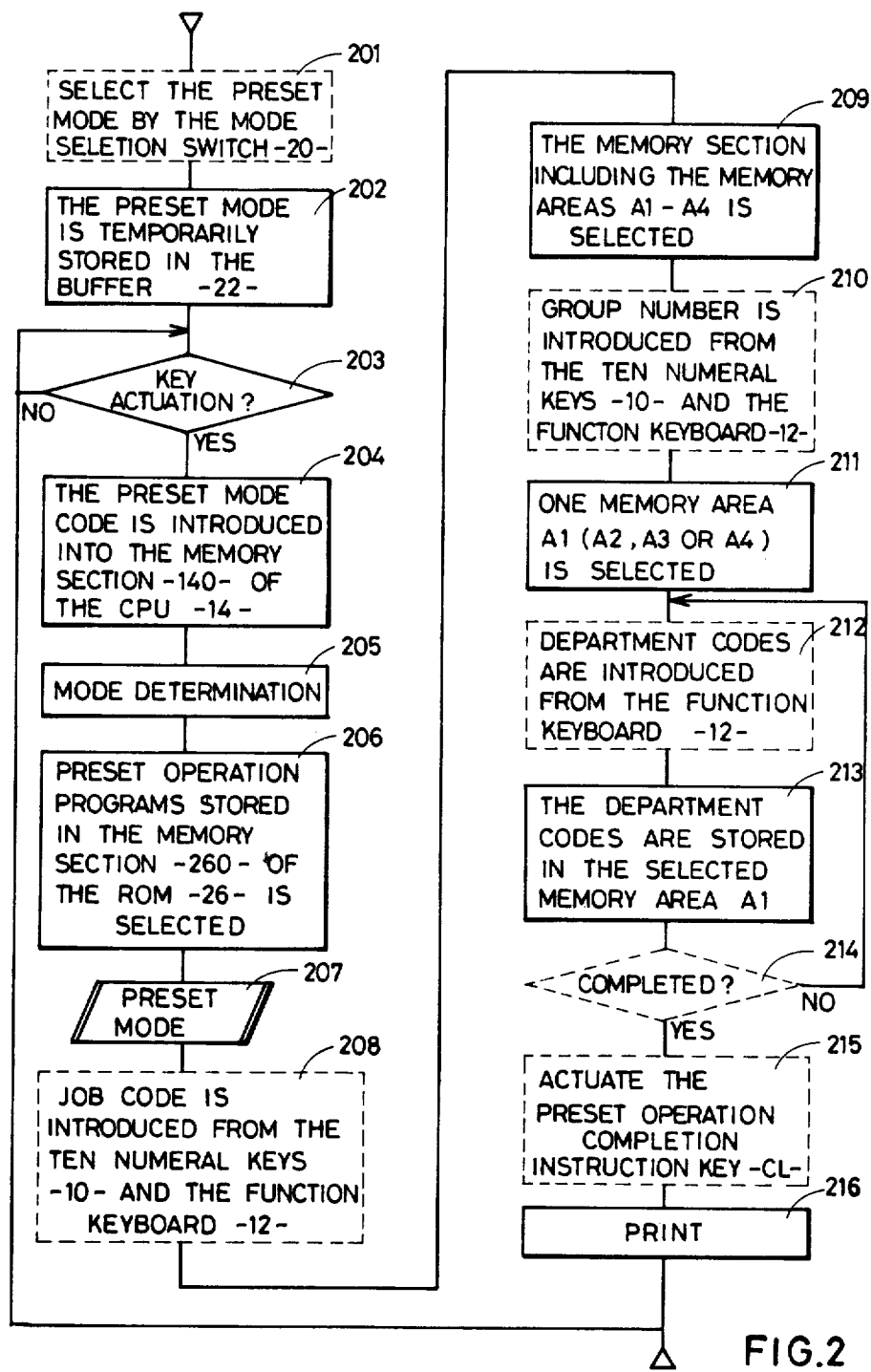
FIG. 2 is a flow chart for explaining a preset operation conducted by the electronic cash register of FIG. 1.
Figure 3B:
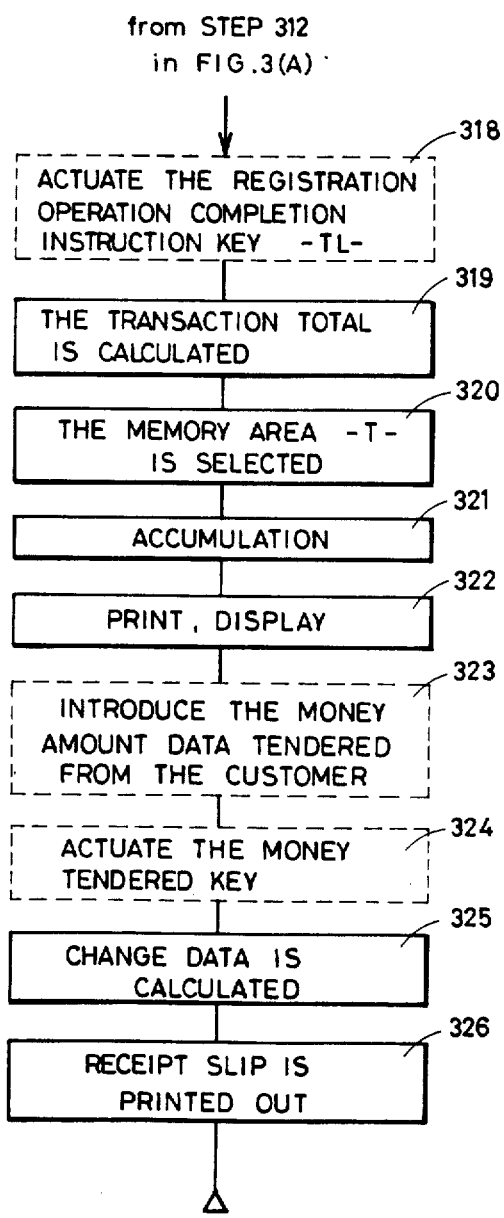

An operational mode of the electronic cash register of FIG. 1 will be described with reference to FIGS. 2, 3(A) and 3(B).

[PRESET OPERATION]

In order to preset the information related to the automatic registration operation of the present invention, the electronic cash register is placed in the preset mode. More specifically, the mode selection switch 20 is operated to select the preset mode (step 201). The preset mode code is temporarily stored in the buffer 22 (step 202). Thereafter, when any one of keys included in the ten numeral keys 10 and the function keyboard 12 is actuated by the operator, the key input detection circuit 24 develops a control signal (step 203) to transfer the preset mode code from the buffer 22 to a memory section 140 included in the central processing unit (CPU) 14 (step 204). When the preset mode code is introduced into the memory section 140, the preset mode code is determined by the central processing unit (CPU) 14 (step 205). The central processing unit (CPU) 14 selects preset operation programs stored in a memory section 260 of the read only memory (ROM) 26 (step 206).

In this way, the electronic cash register is placed in the preset mode (step 207). Then, the operator introduces the job code, for example, "70" through the use of the ten numeral keys 10 and the program selection instruction key (#) 122 (step 208) in order to select the programs related to the preset operation of the automatic registration operation. In response to the introduction of the job code "70", the central processing unit (CPU) 14 selects a memory section 280 (which includes the memory areas A1, A2, A3 and A4) in the random access memory (RAM) 28 (step 209). Under these conditions, the operator selects one memory area, for example the memory area A1, through the use of the ten numeral keys 10 and the RAM area selection key (*) 123 (steps 210 and 211). Then, desired department keys 120 are actuated in a desired order (step 212) to store the department codes in the desired order in the selected memory area, for example, A1 (step 213). In a preferred form, the department codes include a set of articles, for example, soup, beef steak, rice, salad and coffee, which are frequently ordered by one customer at the same time.

In this way, the automatic registration department codes are sequentially introduced into and preset in the memory areas A1, A2, A3 and A4 of the random access memory (RAM) 28. When the preset operation for the groups are completed (step 214), the operator actuates the preset operation completion instruction key (CL) 124 (step 214) to instruct the completion of the preset operation to the central processing unit (CPU) 14. The central processing unit (CPU) 14 activates the printer 32 to print out the preset information onto the receipt slip and/or journal paper (step 216).

That is, an example of the key operation in the preset mode is as follows, wherein the departments "1", "4", "6" and "8" are combined in one group and the related department codes are preset in the memory area A1.

"1" included in the ten numeral keys 10
"*" RAM area selection key 123
"1" included in the department keys 120
"4" included in the department keys 120
"6" included in the department keys 120
"8" included in the department keys 120
"CL" preset operation completion instruction key 124

[REGISTRATION OPERATION]

In order to register the transaction data, the mode selection switch 20 is operated to place the electronic cash register in the registration mode (step 301). When the electronic cash register is placed in the registration mode, the registration operation program stored in a memory section 261 of the read only memory (ROM) 26 are selected to control the registration operation.

First, the operator determines whether the transaction belongs to any one of the groups preset in the memory section 280 (step 302). If the transaction is identical with the preset data stored in, for example, the memory area A1, the operator actuates the numeral key "1" included in the ten numeral keys 10 (step 303) and, then, the automatic registration instruction key (AUTO) 121 included in the function keyboard 12 (step 304) to instruct the automatic registration operation to the central processing unit (CPU) 14.

In response to the thus introduced information, the central processing unit (CPU) 14 selects the selected memory area A1 (step 305) to read out the department codes stored therein (step 306). Memory areas B1, B2, B3, B4 and B5 included in a memory section 281 of the random access memory (RAM) 28 are selected, respectively, in accordance with the department codes read out from the memory area A1 in order to indicate that the transaction related to the departments B1, B2, B3, B4 and B5 has occurred (steps 307 and 308). Then, the unit cost information related to the selected department is read out (step 309) and the unit cost information is printed out onto the receipt slip and/or journal paper (step 310). The operation is repeated to the entire department codes stored in the selected memory area A1 (step 311).

When additional data should be registered (step 312), the operator again checks whether the transaction departments are included in any one of the groups stored in the memory areas A1, A2, A3 and A4 of the memory section 280. When the transaction departments are not classified in any group, the operator introduces the article number from the ten numeral keys 10 and the department information from the department keys 120 (step 313). The central processing unit (CPU) 14 functions to read out the unit cost information of the article identified by the department key 120 (steps 314 and 315) to print out the transaction data by the printer 32 and to display the transaction data on the display device 30 (step 316). The transaction data is memorized in a preselected area in the random access memory (RAM) 28 (step 317).

When the registration operation is completed (step 312), the operator actuates the registration operation completion instruction key (TL) 125 (step 318) to instruct the completion of the registration operation to the central processing unit (CPU) 14. The central processing unit (CPU) 14 functions to calculate the total amount of the transaction (step 319), and the total amount is added to the data stored in an accumulation area T included in the random access memory (RAM) 28 to update the accumulation amount (steps 320 and 321). The total amount of the transaction is printed out by the printer 32 and visually displayed by the display device 30 (step 322). With reference to the total amount displayed by the display device 30, the operator receives money from the customer and inputs the received amount information into the electronic cash register (step 323) and, then, actuates the money tendered key (step 324). The central processing unit (CPU) 14 calculates the change (step 325), and functions to deliver the receipt slip (step 326) to complete the registration operation.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An electronic cash register for performing registration operations for sales transactions of a plurality of commodities comprising:
    keyboard means for entering data identifying particular commodities of a given sales transaction into said register, including,
        a plurality of department keys each identifying an individual commodity to be sold,
        a plurality of numerical keys each identifying a predetermined group of said individual commodities, and an automatic registration key for selecting an automatic registration mode of said register;

memory means for storing commodity identity and pricing information, including, individual memory areas for storing identity and pricing information for each individual commodity to be sold, and group memory areas for storing information identifying a predetermined group of said individual memory areas; and means for registering and computing the amount of said given sales transaction in response to either the input of individual commodity data by said department keys, or the input of group commodity data by said numerical keys in conjunction with the activation of said automatic registration key, by retrieving pricing information directly from said individual memory areas, or retrieving pricing information from individual memory areas identified by said group memory areas, respectively.

2. The electronic cash register of claim 1 further comprising:

mode selection means for selectively placing said cash register in either a presetting mode or a registration mode;

means for selectively inputting the identity of each of said predetermined groups of individual memory areas into said group memory areas while in said presetting mode by actuation of the separate department keys on said keyboard; and means for enabling the registration and computing of sales transaction amounts when in the registration mode.

* * * * *